United States Patent

Okada

(10) Patent No.: US 9,598,051 B2
(45) Date of Patent: Mar. 21, 2017

(54) POWER CONSUMPTION SUPPRESSION SYSTEM FOR ELECTRONIC KEY TERMINAL AND POWER CONSUMPTION SUPPRESSION METHOD FOR ELECTRONIC KEY TERMINAL

(71) Applicant: Hiroki Okada, Musashino (JP)

(72) Inventor: Hiroki Okada, Musashino (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 14/652,312

(22) PCT Filed: May 27, 2013

(86) PCT No.: PCT/JP2013/064643
§ 371 (c)(1),
(2) Date: Jun. 15, 2015

(87) PCT Pub. No.: WO2014/119023
PCT Pub. Date: Aug. 7, 2014

(65) Prior Publication Data
US 2016/0001743 A1 Jan. 7, 2016

(30) Foreign Application Priority Data
Jan. 31, 2013 (JP) ................................. 2013-017435

(51) Int. Cl.
*B60R 25/20* (2013.01)
*B60R 25/40* (2013.01)

(52) U.S. Cl.
CPC ........ *B60R 25/403* (2013.01); *B60R 25/2018* (2013.01); *B60R 25/406* (2013.01)

(58) Field of Classification Search
CPC .... B60R 25/403; B60R 25/2018; G08B 29/00
(Continued)

(56) References Cited

U.S. PATENT DOCUMENTS 6,694,258 B2 * 2/2004 Johnson .................. B60R 25/33
340/10.6
8,232,897 B2 * 7/2012 Tieman ..................... G01S 1/66
340/990

(Continued)

FOREIGN PATENT DOCUMENTS

JP 2000-145225 A 5/2000
JP 2008-285946 A 11/2008
(Continued)

OTHER PUBLICATIONS

International Search Report for PCT/JP2013/064643 dated Jul. 16, 2013.

*Primary Examiner* — Behrang Badii
*Assistant Examiner* — Michael Berns
(74) *Attorney, Agent, or Firm* — Sughrue Mion, PLLC

(57) ABSTRACT

A power consumption suppression system enables effective reduction of power consumption of an electronic key terminal. A position information acquisition section (210) provided on an electronic key terminal (200) acquires locking location information concerning the locking position of a vehicle (100) and terminal location information concerning the position of the electronic key terminal (200). A power consumption suppression section (220) provided on the electronic key terminal (200) reduces the power consumption when the distance between the locking location of the vehicle (100) indicated by the locking location information and the location of the electronic key terminal (200) indicated by the terminal location information is equal to or longer than a prescribed distance.

9 Claims, 7 Drawing Sheets

(58) Field of Classification Search
USPC .............................................................. 701/2
See application file for complete search history.

(56) References Cited

U.S. PATENT DOCUMENTS

| | | | | |
|---|---|---|---|---|
| 8,423,203 | B2* | 4/2013 | Takeuchi | ................ B60R 25/24 |
| | | | | 701/2 |
| 8,494,765 | B2* | 7/2013 | Konet | .................. G01C 22/006 |
| | | | | 701/408 |
| 8,547,253 | B2* | 10/2013 | Proefke | .................. G01S 13/74 |
| | | | | 340/5.72 |
| 9,194,168 | B1* | 11/2015 | Lu | ........................... E05F 15/70 |
| 2001/0054952 | A1* | 12/2001 | Desai | ...................... E05B 77/48 |
| | | | | 340/5.72 |
| 2002/0143611 | A1* | 10/2002 | Odinak | ................ G06Q 20/102 |
| | | | | 705/13 |
| 2007/0103271 | A1* | 5/2007 | King | ...................... B60R 25/24 |
| | | | | 340/5.72 |
| 2011/0140926 | A1* | 6/2011 | Schrabler | .............. B60R 25/102 |
| | | | | 340/989 |
| 2013/0035165 | A1* | 2/2013 | Satake | .............. H04L 29/06034 |
| | | | | 463/42 |
| 2016/0001743 | A1* | 1/2016 | Okada | .................. B60R 25/406 |
| | | | | 701/2 |

FOREIGN PATENT DOCUMENTS

| | | | |
|---|---|---|---|
| JP | 4332820 | B2 | 9/2009 |
| JP | 2009-275427 | A | 11/2009 |
| JP | 2010-202043 | A | 9/2010 |

* cited by examiner

| Vehicle Type | Vehicle Information | Electronic Key Terminal Information | User Name |
|---|---|---|---|
| Vehicle C1 | Vehicle ID-1 | Terminal IDx1 | User A |
| | | Terminal IDx2 | User B |
| | | Terminal IDx3 | User C |
| Vehicle C2 | Vehicle ID-2 | Terminal IDy1 | User D |
| | | Terminal IDy2 | User E |
| | | Terminal IDy3 | User F |
| . | . | . | . |
| . | . | . | . |

POWER CONSUMPTION SUPPRESSION SYSTEM FOR ELECTRONIC KEY TERMINAL AND POWER CONSUMPTION SUPPRESSION METHOD FOR ELECTRONIC KEY TERMINAL

CROSS REFERENCE TO RELATED APPLICATIONS

This application is a National Stage of International Application No. PCT/JP2013/064643 filed May 27, 2013, claiming priority based on Japanese Patent Application No. 2013-017435, filed Jan. 31, 2013, the contents of all of which are incorporated herein by reference in their entirety.

TECHNICAL FIELD

The present disclosure relates to a power consumption suppression system for an electronic key terminal to be used as a vehicle key and relates to a power consumption suppression method for an electronic key terminal.

BACKGROUND ART

In recent years, SMART ENTRY ™ key systems (registered trademark) being capable of locking or unlocking doors of vehicles without using mechanical keys have been widely used. In SMART ENTRY ™ key systems, when a user carrying an electronic key approaches the vehicle, an on-vehicle device collates the ID code of the electronic key. When the validity of the electronic key is authorized as a result of the collation, the doors of the vehicle can be locked or unlocked without performing an opening or closing operation through insertion of a mechanical key into a cylinder lock of the vehicle.

At the time of authentication, the electronic key receives a request signal transmitted by the on-vehicle device. When receiving the request signal, the electronic key transmits a response signal including the ID code to the on-vehicle device. The on-vehicle device receives the response signal and performs authentication depending on whether there is a match between an ID code registered in advance and the ID code included in the response signal.

As the electronic key transmits or receives signals to or from the on-vehicle device, the remaining level of the rechargeable battery contained in the electronic key gradually gets low. For this reason, when the remaining level of the rechargeable battery falls below a predetermined value, the doors of the vehicle cannot be locked or unlocked and the engine cannot be started by using the electronic key.

Therefore, for example, a keyless device described in Patent Document 1 calculates a relative distance between an on-vehicle device and an electronic key through communications between the on-vehicle device and the electronic key as a mobile device. The keyless device stops communications for locking or unlocking the vehicle doors if the relative distance has exceeded a threshold.

PRIOR ART DOCUMENTS

Patent Documents

Patent Document 1: Japanese Laid-Open Patent Publication No. 2008-285946

SUMMARY OF THE INVENTION

Problems that the Invention is to Solve

To conduct communications for calculation of the relative distance between the mobile device and the on-vehicle device, the mobile device inevitably consumes power for the communications, which hinders suppression of overall power consumption.

The electronic key terminal described above in Technical Field includes an electronic key that functions also as a mechanical key matching with a cylinder lock in the vehicle. Further, the electronic key terminal is a general name for electronic keys configured to have several kinds of functions, mobile devices having an electronic key function, and information terminals having an electronic key function.

An objective of the disclosure is to provide a power consumption suppression system for an electronic key terminal and a power consumption suppression method for an electronic key terminal that enable effective suppression of power consumption in the electronic key terminal.

Means for Solving the Problems

In accordance with one aspect of the present disclosure, a power consumption suppression system for an electronic key terminal is provided that suppresses power consumption in an electronic key terminal that communicates with an on-vehicle device in a vehicle. The system includes a location information acquisition section and a power consumption suppression section. The location information acquisition section is configured to acquire locking location information as information on a location where the vehicle has been locked with the electronic key terminal and terminal location information as information on a location of the electronic key terminal. The power consumption suppression section is configured to suppress power consumption in the electronic key terminal when a relative distance between the location where the vehicle has been locked indicated by the locking location information acquired by the location information acquisition section and the location of the electronic key terminal indicated by the terminal location information is equal to or longer than a prescribed distance.

A power consumption suppression method according to another aspect of the disclosure is a power consumption suppression method for an electronic key terminal by which power consumption in an electronic key terminal that communicates with an on-vehicle device in a vehicle is suppressed. The power consumption suppression method includes: an acquisition step for acquiring locking location information as information on a location where the vehicle has been locked with the electronic key terminal and terminal location information as information on a location of the electronic key terminal; and a suppression step for suppressing the power consumption in the electronic key terminal when a relative distance between the location where the vehicle has been locked indicated by the acquired locking location information and the location of the electronic key terminal indicated by the terminal location information is equal to or longer than a prescribed distance.

When a vehicle is stopped or parked, the vehicle doors are usually locked after stoppage of the engine. That is, the spot where the vehicle doors are locked is substantially the same as the spot where the vehicle is stopped or parked.

In the foregoing configuration or method, the locking location information indicative of the spot where the vehicle doors have been locked is acquired and held in the electronic key terminal. The location indicated by the locking location information is used as a vehicle stopped or parked location. This allows the electronic key terminal to calculate the relative distance between the electronic key terminal and the vehicle based on the locking location information indicative of the vehicle stopped or parked location and the terminal location information indicative of its location. Therefore, when acquiring only the locking location information, the electronic key terminal does not need to conduct communications for calculation of the relative distance from the vehicle. When the relative distance is equal to or longer than a prescribed distance, the electronic key terminal is unlikely to be used for locking of the vehicle doors, and thus power consumption in the electronic key terminal is suppressed. Accordingly, the power consumption is effectively suppressed based on the relative distance between the electronic key terminal and the vehicle.

In accordance with one form of the disclosure, the power consumption suppression system further includes a center that manages the locking location information. The vehicle is used by a plurality of users. The on-vehicle device communicates with a plurality of electronic key terminals possessed by the users. When the vehicle is locked with a first electronic key terminal, which is one of the electronic key terminals, the center acquires the locking location information from the first electronic key terminal and delivers the acquired locking location information to a second electronic key terminal, which is different from the first electronic key terminal.

In many cases, a vehicle is shared by a plurality of users. If one user locks the vehicle doors by his or her electronic key terminal and then another user uses the vehicle, the vehicle stopped or parked location may be changed. Accordingly, the location where the vehicle doors are locked that is indicated by the locking location information acquired by one user's electronic key terminal may differ from the location where the vehicle doors are locked that is indicated by the locking location information acquired by another user's electronic key terminal.

In this respect, according to the foregoing configuration, when the vehicle doors are locked with the first electronic key terminal possessed by one user, the locking location information indicating the location of the vehicle doors locked with the first electronic key terminal is acquired from the center. The acquired locking location information is delivered to the one or more second electronic key terminals different from the first electronic key terminal. Accordingly, when the vehicle is used by the user of the first electronic key terminal different from the second electronic key terminals, the locking location information indicating the location of the vehicle after the usage is delivered to the one or more second electronic key terminals. Therefore, even if the location of the vehicle is changed by the user different from those of the second electronic key terminals, the second electronic key terminals can keep track of the changed location of the vehicle.

In accordance with one form of the disclosure, a location information acquisition section provided in the second electronic key terminal updates acquired information on the location where the shared vehicle has been locked with the locking location information delivered from the center.

According to the foregoing configuration, when the locking location information is delivered from the center, the second electronic key terminal updates the locking location information as information for calculating the relative distance between the vehicle and the second electronic key terminal. Based on the updated information, the relative distance between the second electronic key terminal and the vehicle is calculated. Accordingly, even if the vehicle is shared by a plurality of users, the power consumption is suppressed based on the latest vehicle location information.

In accordance with one form of the disclosure, the center holds a management table in which identification information on users sharing the vehicle or identification information on the electronic key terminals possessed by the users is registered for each vehicle, and the center refers to the management table to determine the second electronic key terminal to which the locking location information is to be delivered.

According to the foregoing configuration, the center has the management table. This allows the center to accurately determine the destinations to which the locking location information is to be delivered only by referring to the management table. Therefore, the locking location information is smoothly operated and the destinations to which the locking location information is to be delivered is properly determined. Thus, the locking location information is properly delivered to the electronic key terminals possessed by the users sharing the vehicle.

In accordance with one form of the disclosure, the electronic key terminal includes an authentication section that authenticates the on-vehicle device through execution of an application program for authentication, and the power consumption suppression section sets an area of execution of the application program by the authentication section within a range of the prescribed distance, thereby suppressing the power consumption in the electronic key terminal.

In many cases, the authentication by the electronic key terminal is performed through execution of the application program installed in the electronic key terminal. Meanwhile, when such an application program is executed, the authentication section becomes active to increase the amount of power consumption.

In this respect, according to the foregoing configuration, the execution area of the application program to be executed by the authentication section is limited to the range of a prescribed distance. Accordingly, the application program is not executed in an area where the relative distance between the electronic key terminal and the vehicle is out of the prescribed range, thereby preferably suppressing the power consumption resulting from the execution of the application program.

In accordance with one form of the disclosure, the power consumption suppression section changes intervals between executions of communications for authentication between the electronic key terminal and the on-vehicle device, thereby suppressing the power consumption in the electronic key terminal.

Upon the authentication between the electronic key terminal and the on-vehicle device, identification information for verification of each other's validity is exchanged through the communications for authentication. Meanwhile, the power is consumed each time the communications for authentication are performed.

In this respect, according to the foregoing configuration, when the relative distance between the electronic key terminal and the vehicle is equal to or longer than the prescribed distance, the time intervals between executions of communications are relatively longer, for example. Accordingly, the amount of power consumption is reduced when the relative distance between the electronic key terminal and the vehicle is equal to or longer than the prescribed distance, as compared to when the relative distance between the electronic key terminal and the vehicle is shorter than the prescribed distance. Therefore, the power consumption can be suppressed by making a change to the intervals between executions.

In accordance with one form of the disclosure, the electronic key terminal is a mobile terminal with a telephone function and a telecommunication function, and the power consumption suppression section turns off at least one of the telephone function and the telecommunication function of the mobile terminal, thereby suppressing the power consumption.

Lately, electronic key terminals are often configured as mobile terminals with a telephone function and a telecommunication function. Meanwhile, such electronic key terminals consume a large amount of power by the telephone function and the telecommunication function. Accordingly, the remaining level of the rechargeable battery in the electronic key terminal decreases regardless of whether the electronic key terminal is or is not used for control of locking of the vehicle doors.

In this respect, according to the foregoing configuration, as the electronic key terminal, a mobile terminal with a telephone function and a telecommunication function is employed. The power consumption in the mobile terminal is suppressed by turning off at least one of the telephone function and the telecommunication function. Accordingly, the power consumption in the rechargeable battery of the mobile terminal can be suppressed. Therefore, the remaining level of the rechargeable battery in the mobile terminal is more likely to be kept at or higher than a predetermined level, thereby maintaining the function of the electronic key in a preferable manner.

MODES FOR CARRYING OUT THE INVENTION

First Embodiment

Figure 1:
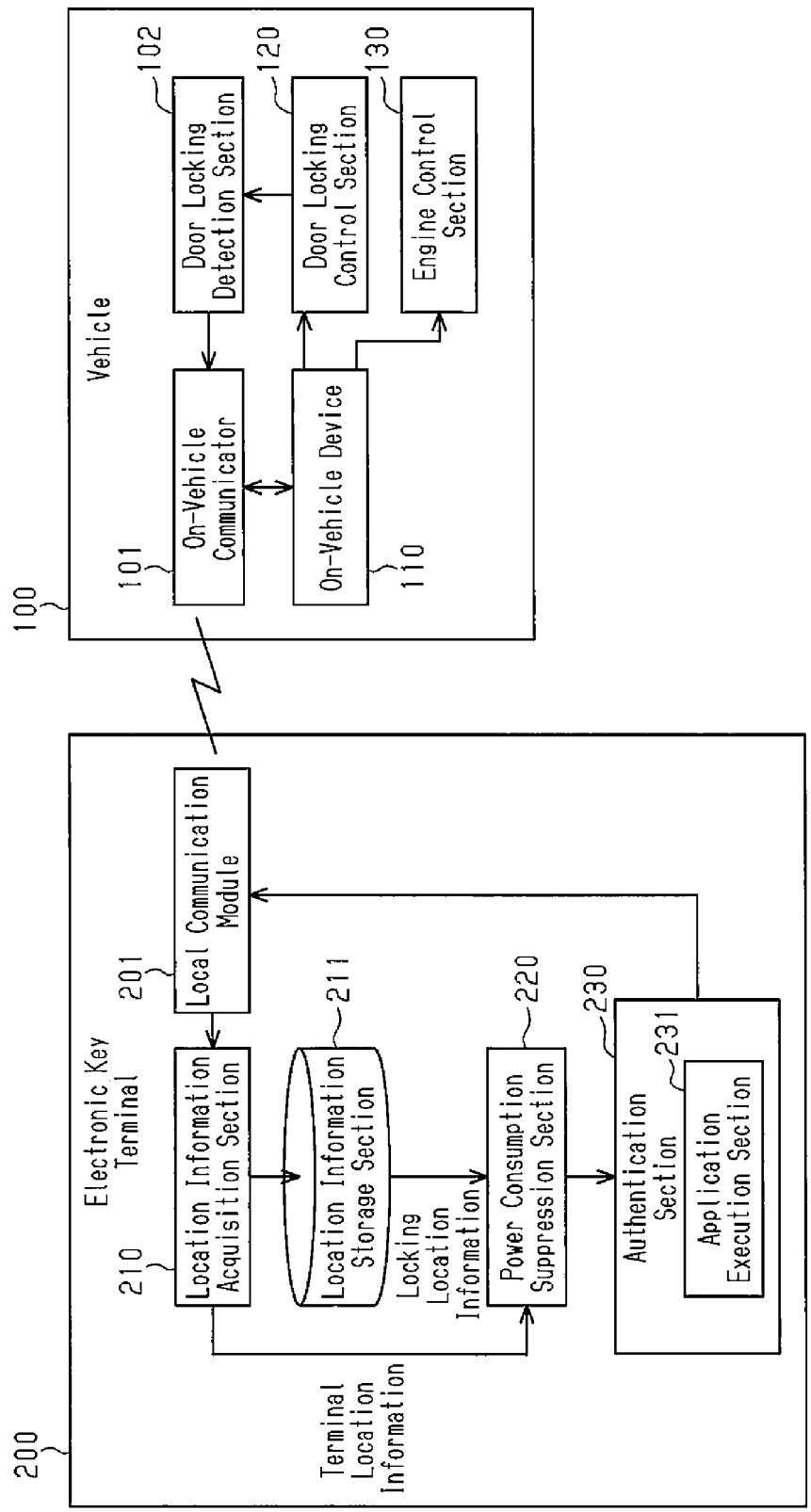
FIG. 1 is a block diagram of a power consumption suppression system for an electronic key terminal and a power consumption suppression method for an electronic key terminal according to a first embodiment of the disclosure, specifically, a block diagram schematically illustrating the configuration of an electronic key terminal to which the power consumption suppression system for an electronic key terminal and the power consumption suppression method for an electronic key terminal are applied and a vehicle using the electronic key terminal.
Figure 2:
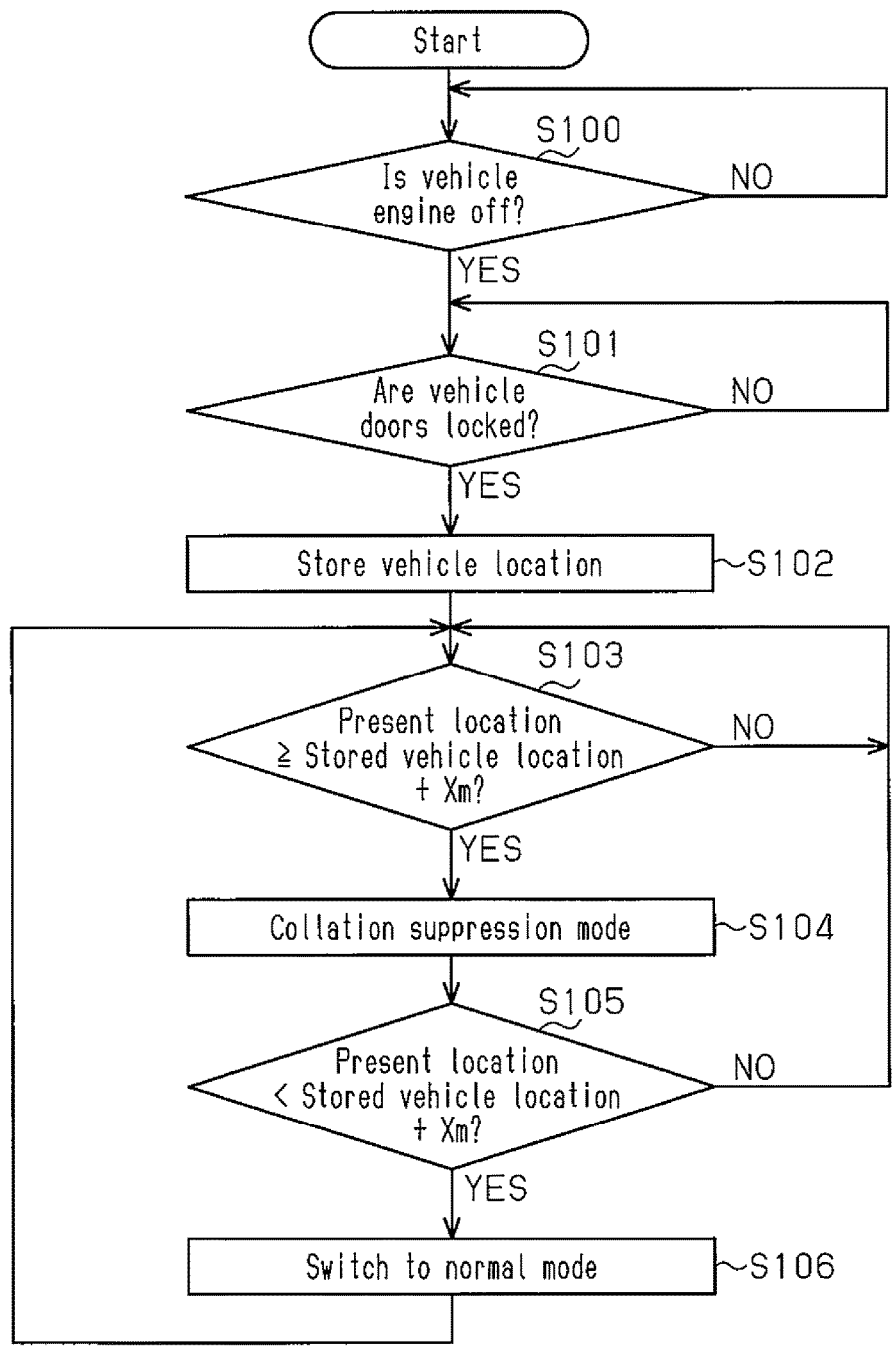
FIG. 2 is a flowchart illustrating one example of a power consumption suppression procedure in the embodiment of FIG. 1.
Figure 3:
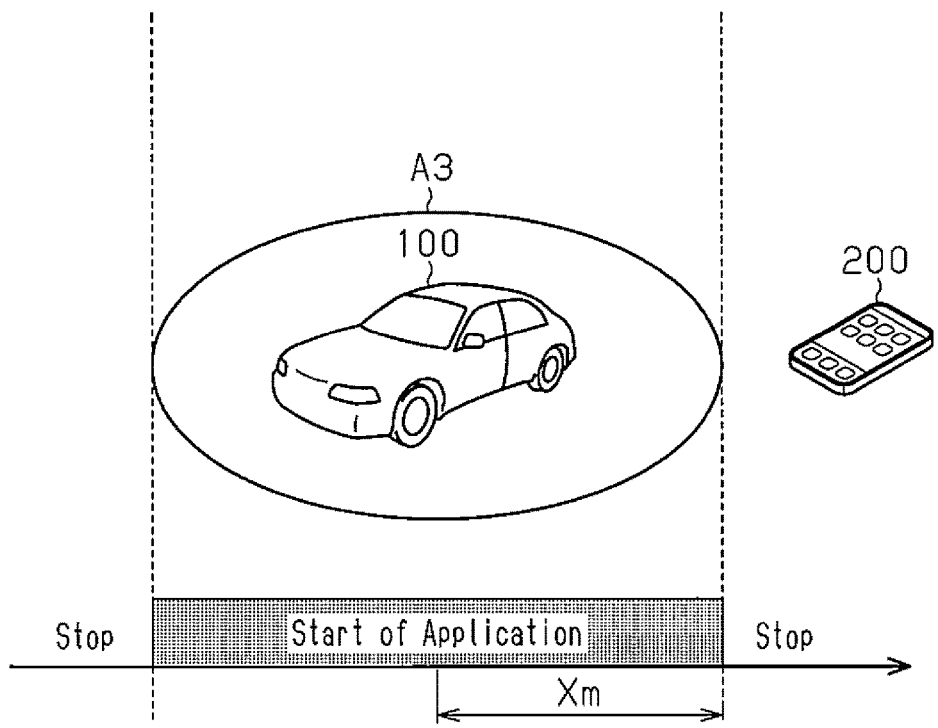
FIG. 3 is a diagram illustrating one example of an execution area of an application program.

FIGS. 1 to 3 describe a power consumption suppression system for an electronic key terminal and a power consumption suppression method for an electronic key terminal according to a first embodiment of the disclosure.

As illustrated in FIG. 1, a vehicle 100, to which the power consumption suppression system for an electronic key terminal and the power consumption suppression method for an electronic key terminal according to the present embodiment are applied, includes an on-vehicle communicator 101, which communicates with an electronic key terminal 200, and a door locking detection section 102, which detects locked and unlocked states of the doors of the vehicle 100.

The vehicle 100 also includes an on-vehicle device 110 that communicates with the electronic key terminal 200 via the on-vehicle communicator 101, a door locking control section 120 that controls locking and unlocking of the door, and an engine control section 130 that controls the engine.

When receiving a control signal indicative of an instruction for locking or unlocking the doors of the vehicle 100 from the electronic key terminal 200 such as a multi-function telephone, for example, the on-vehicle device 110 outputs the control signal to the door locking control section 120. When receiving a control signal indicative of an instruction for turning on or off the engine of the vehicle 100 from the electronic key terminal 200, the on-vehicle device 110 outputs the control signal to the engine control section 130.

When the control signal indicative of an instruction for locking the doors is input from the on-vehicle device 110 while the doors of the vehicle 100 are unlocked, the door locking control section 120 switches the doors of the vehicle 100 from the unlocked state to the locked state.

When the control signal indicative of an instruction for unlocking the doors is input from the on-vehicle device 110 while the doors of the vehicle 100 are locked, the door locking control section 120 switches the doors of the vehicle 100 from the locked state to the unlocked state.

After switching between the locked and unlocked states of the doors, the door locking control section 120 of the present embodiment outputs a signal indicative of the switched state of the doors to the door locking detection section 102. The door locking detection section 102 detects whether the doors of the vehicle 100 are locked or unlocked according to the signal input from the door locking control section 120. The door locking detection section 102 transmits the detection result to the electronic key terminal 200 via the on-vehicle communicator 101.

The electronic key terminal 200 includes a local communication module 201 that communicates with the on-vehicle communicator 101 of the vehicle 100 and a location information acquisition section 210 that acquires locking location information as information on the location where the doors of the vehicle 100 have been locked. The electronic key terminal 200 also includes a power consumption suppression section 220 that suppresses power consumption in the electronic key terminal 200 and an authentication section 230 that authenticates the on-vehicle device 110.

The location information acquisition section 210 is configured to have a GPS, for example. When receiving input of a signal from the local communication module 201 indicating that the doors of the vehicle 100 have been switched from the unlocked state to the locked state, the location information acquisition section 210 acquires from the GPS a GPS signal indicating the latitude and longitude of the electronic key terminal 200. The location information acquisition section 210 adds the information on the location where the doors of the vehicle 100 have been locked to the acquired GPS signal and stores the same as locking location information in a location information storage section 211.

The location information acquisition section 210 periodically acquires the GPS signal and outputs the acquired GPS signal as terminal location information indicating the present location of the electronic key terminal 200 to the power consumption suppression section 220.

When receiving input of the terminal location information, the power consumption suppression section 220 calculates a relative distance between the location where the vehicle doors have been locked and the location of the electronic key terminal 200 based on the location information stored in the location information storage section 211 and the terminal location information. Accordingly, the relative distance between the location where the vehicle doors have been locked, that is, the location of the vehicle 100, and the location of the electronic key terminal 200 is calculated.

When the calculated relative distance is equal to or longer than a prescribed threshold, for example, approximately 200 m, the power consumption suppression section 220 outputs to the authentication section 230 a suppression signal indicative of an instruction for suppressing the power consumption in the electronic key terminal 200.

The authentication section 230 has an application execution section 231 that executes an application program for authentication. When the calculated relative distance is shorter than the threshold, the application execution section 231 executes the application program. Accordingly, the authentication section 230 of the electronic key terminal 200 and the on-vehicle device 110 of the vehicle 100 periodically communicate with each other for authentication. Upon the authentication, identification information such as ID possessed by the authentication section 230 of the regular electronic key terminal 200 is transmitted to the on-vehicle device 110. The on-vehicle device 110 collates the identification information to verify validity of the electronic key terminal 200. When the electronic key terminal 200 is authenticated as valid, the on-vehicle device 110 unlocks the doors or starts the engine according to a user operation on the electronic key terminal 200.

In contrast, upon receipt of input of a suppression signal from the power consumption suppression section 220 when the calculated relative distance is equal to or longer than the threshold, the application execution section 231 stops execution of the application program. Accordingly, the authentication section 230 is shifted from a normal operation mode to a power consumption suppression mode.

Hereinafter, operations of the power consumption suppression system for an electronic key terminal and the power consumption suppression method for an electronic key terminal according to the present embodiment will be described with reference to FIGS. 2 and 3.

As illustrated in FIG. 2, when the engine of the vehicle 100 is turned off with the electronic key terminal 200 (step S100: YES) and the doors of the vehicle 100 are locked (step S101: YES), the door locking detection section 102 of the vehicle 100 detects that the doors are locked. The on-vehicle device 110 transmits the result of the detection by the door locking detection section 102 to the electronic key terminal 200 to notify the electronic key terminal 200 that the doors have been locked.

When the electronic key terminal 200 detects that the doors are locked based on the notification from the on-vehicle device 110, the location information acquisition section 210 acquires location information. The location information acquisition section 210 stores the acquired location information in the location information storage section 211 (step S102: acquisition step). Accordingly, the location information storage section 211 stores the location information indicating the locations of the vehicle 100 and the electronic key terminal 200 when the doors of the vehicle 100 were switched from the unlocked state to the locked state.

Then, it is determined whether a relative distance between the location indicated by the stored location information and the location indicated by the terminal location information of the electronic key terminal 200 is equal to or longer than a threshold X as a prescribed distance (step S103).

When the relative distance is equal to or longer than the threshold X (step S103: YES), the distance between the vehicle 100 and the electronic key terminal 200 is equal to or longer than the predetermined distance. Accordingly, the authentication section 230 stops operation because the electronic key terminal 200 is unlikely to be used for unlocking the doors (step S104: suppression step). Therefore, the electronic key terminal 200 is brought into a collation suppression mode in which collation through execution of the application program is suppressed, thereby suppressing the power consumption in the electronic key terminal 200.

Then, it is determined at step S104 whether the relative distance becomes shorter than the threshold X. For example, when the relative distance becomes shorter than the threshold X because the user of the electronic key terminal 200 approaches the vehicle 100 for riding (step S105: YES), the power consumption suppression section 220 outputs to the authentication section 230 a start signal indicative of an instruction for starting operation. Accordingly, the application execution section 231 executes the application program to shift the electronic key terminal 200 from the collation suppression mode to normal operation mode (step S106).

When shifting to the normal mode, the authentication section 230 of the electronic key terminal 200 communicates with the on-vehicle device 110 for authentication at predetermined time intervals (cycles). When the authentication is completed, the doors are unlocked or the engine is started according to a user operation on the electronic key terminal 200.

As illustrated in FIG. 3, in the present embodiment, for example, an area A3 at a radius of X m centering on the location where a locking operation has been performed, that is, the location where the vehicle 100 has been stopped, is set as an application start area where the application program is executed.

In contrast, the area out of the area A3 at a radius of X m centering on the location where the locking operation has been performed, that is, the location where the vehicle 100 has been stopped, is set as an application stop area.

Accordingly, within the area A3, the application program is executed and the authentication section 230 of the electronic key terminal 200 and the on-vehicle device 110 of the vehicle 100 communicate with each other. This suppresses the power consumption in the electronic key terminal 200.

As described above, the power consumption suppression system for an electronic key terminal and the power consumption suppression method for an electronic key terminal according to the present embodiment provide the following advantages.

(1) The location information acquisition section 210 provided in the electronic key terminal 200 acquires the locking location information as information on the location where the vehicle 100 has been locked and the terminal location information as information on the location of the electronic key terminal 200. The power consumption suppression section 220 provided in the electronic key terminal 200 suppresses the power consumption when the relative distance between the locking location of the vehicle 100 indicated by the locking location information and the location of the electronic key terminal 200 indicated by the terminal location information is equal to or longer than the prescribed distance. This allows the electronic key terminal 200 to calculate the relative distance between the electronic key terminal 200 and the vehicle 100 based on the locking location information indicating the stopped or parked location of the vehicle 100 and the terminal location information indicative of its location. Accordingly, as far as the electronic key terminal 200 acquires the locking location information, the electronic key terminal 200 does not need to conduct communications for calculation of the relative distance from the vehicle. When the relative distance is equal to or longer than the prescribed distance, the power consumption in the electronic key terminal is suppressed because the electronic key terminal 200 is unlikely to be used for locking the doors of the vehicle 100. Thus, the power consumption is effectively suppressed based on the relative distance between the electronic key terminal 200 and the vehicle 100.

(2) The electronic key terminal 200 includes the authentication section 230 that authenticates the on-vehicle device 110 through execution of the application program for authentication. The power consumption suppression section 220 sets the area of execution of the application program by the authentication section 230 within the range (A3) of the prescribed distance to suppress the power consumption in the electronic key terminal 200. Accordingly, no application program is executed in the area where the relative distance between the electronic key terminal 200 and the vehicle 100 is out of the prescribed range (A3). This preferably suppresses the power consumption resulting from execution of the application program.

Second Embodiment

FIGS. 4 to 9 describe a power consumption suppression system for an electronic key terminal and a power consumption suppression method for an electronic key terminal according to a second embodiment of the disclosure, mainly with regard to differences from the first embodiment. The power consumption suppression system for an electronic key terminal and the power consumption suppression method for an electronic key terminal according to the present embodiment are the same in basic configuration as the first embodiment. In FIGS. 4 to 9, substantially the same elements as those in the first embodiment are designated by the same reference numerals as those in the first embodiment, and duplicate descriptions thereof are omitted.

Figure 4:
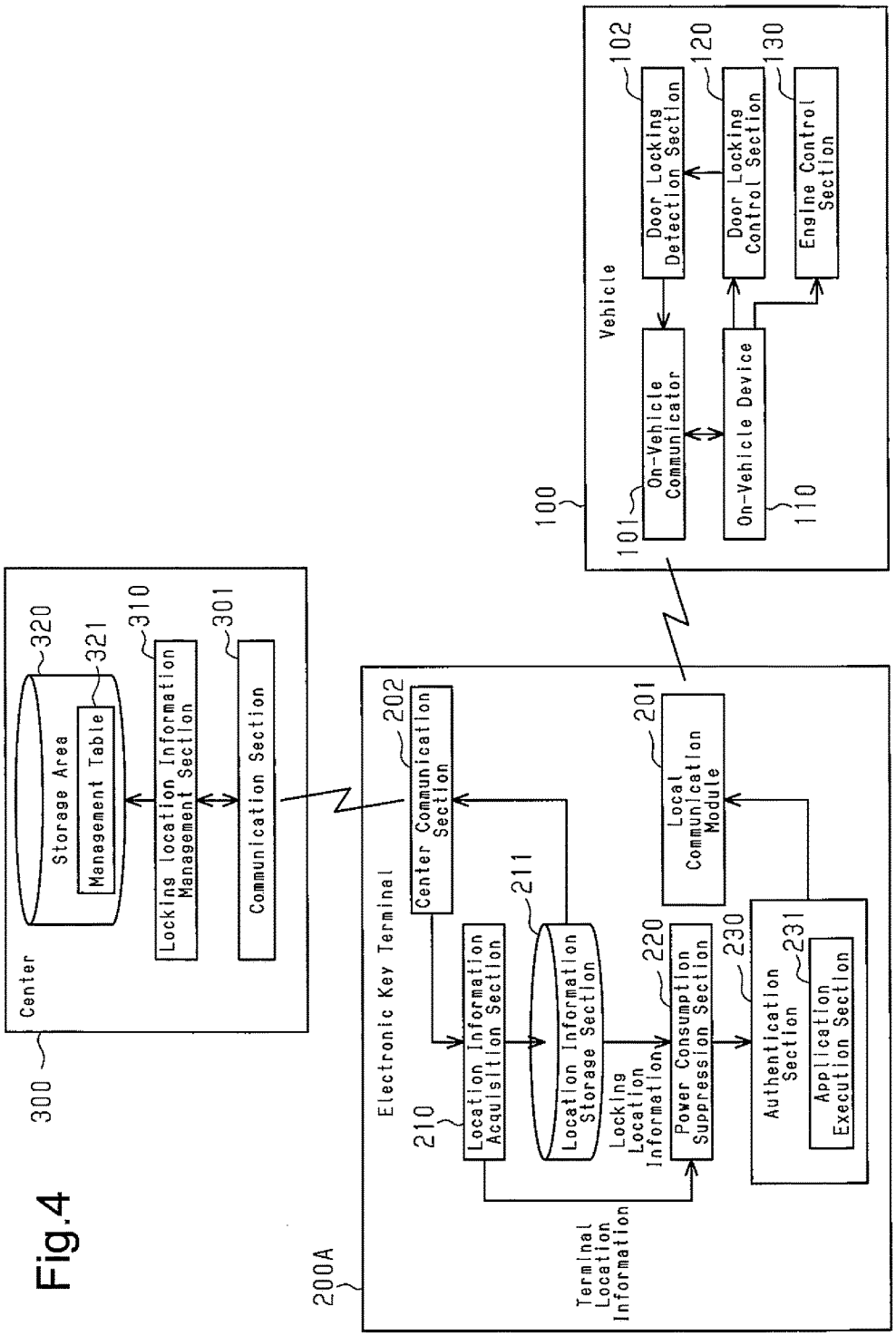
FIG. 4 illustrates a power consumption suppression system for an electronic key terminal and a power consumption suppression method for an electronic key terminal according to a second embodiment of the disclosure and is a block diagram schematically illustrating the configuration of an electronic key terminal to which the power consumption suppression system for an electronic key terminal and the power consumption suppression method for an electronic key terminal are applied, a vehicle, and a center.

As illustrated in FIG. 4, an electronic key terminal 200A, to which the power consumption suppression system for an electronic key terminal and the power consumption suppression method for an electronic key terminal according to the present embodiment are applied, includes a center communication section 202 that communicates with a center 300, which manages locking location information.

When the doors are locked after running of the vehicle 100 by the user of the electronic key terminal 200A, the center communication section 202 acquires from the location information storage section 211 lock operation location information indicative of the location where the door locking operation has been performed. The center communication section 202 associates the acquired lock operation location information with a unique terminal ID of the electronic key terminal 200A and transmits the lock operation location information and the electronic key terminal information to the center 300.

The center 300 may distribute the lock operation location information of a second electronic key terminal. The second electronic key terminal is different from the electronic key terminal 200A (first electronic key terminal) and is possessed by the user sharing the vehicle 100. When the lock operation location information of the second electronic key terminal is delivered from the center 300, the center communication section 202 outputs the lock operation location information to the location information acquisition section 210.

The location information acquisition section 210 overwrites the lock operation location information already stored in the location information storage section 211 with the lock operation location information input from the center communication section 202 as information indicating the latest stopped or parked location of the vehicle 100. The power consumption suppression section 220 calculates a relative distance between the electronic key terminal 200A and the vehicle 100 based on the overwritten lock operation location information to thereby suppress the power consumption.

The center 300 includes a communication section 301 that communicates with a plurality of electronic key terminals including the electronic key terminal 200A and a locking location information management section 310 that manages locking location information acquired from the electronic key terminals. The center 300 also includes a storage area 320 that stores a management table 321 for use in delivery of the locking location information.

When the locking location information is transmitted from the electronic key terminal 200A, for example, the locking location information management section 310 refers to the management table 321 to determine the destination to which the locking location information is to be delivered. When determining the destination of delivery, the locking location information management section 310 delivers the locking location information of the electronic key terminal 200A to the determined destination of delivery.

Figures 5, 6:
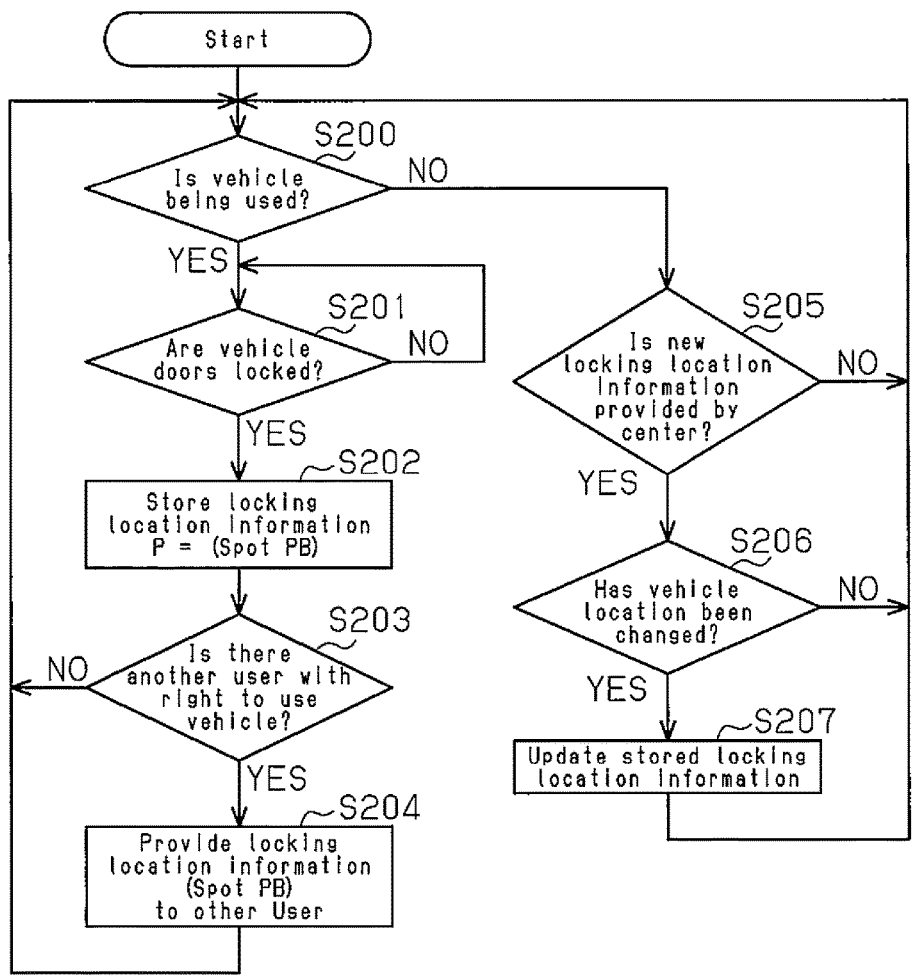
FIG. 5 is a diagram illustrating one example of a management table of FIG. 4.
FIG. 6 is a flowchart illustrating one example of a power consumption suppression procedure in the embodiment of FIG. 4.

As illustrated in FIG. 5, vehicle IDs as unique vehicle information are registered in the management table 321. Terminals IDx1, IDx2, . . . , which are electronic key terminals possessed by the users A, B, . . . , who share the vehicle are associated with the vehicle IDs.

In the present embodiment, for example, when the terminal ID associated with the locking location information transmitted from the electronic key terminal 200A (the first electronic key terminal) is IDx1, the locking location information management section 310 determines that the users sharing the vehicle 100 are users A to C with the terminal IDs that are IDx1 to IDx3. The locking location information management section 310 delivers the locking location information transmitted from the electronic key terminal 200A to the terminals other than the electronic key terminal 200A, that is, the electronic key terminals with the terminal IDs that are IDx2 and IDx3. When the vehicle 100 is used by the user A to change its stopped or parked location, the locking location information is delivered to the electronic key terminals possessed by the other users sharing the vehicle 100. Accordingly, all of the electronic key terminals possessed by the users sharing the vehicle 100 can acquire the locking location information indicating the latest lock operation location of the vehicle 100.

For example, when the locking location information is transmitted from the electronic key terminal possessed by the user B, the locking location information management section 310 determines the terminal IDs of the electronic key terminals possessed by the other users, that is, the users A and C, based on the terminal ID that is IDx2 associated with the locking location information. The locking location information management section 310 delivers the locking location information acquired from the electronic key terminal possessed by the user B to the electronic key terminals with the determined terminal IDs. Accordingly, the locking location information indicative of the locking location changed by the user B's use of the vehicle is delivered to the electronic key terminal 200A.

When the locking location information is delivered, the electronic key terminal 200A causes the center communication section 202 to output the locking location information to the location information acquisition section 210. When receiving input of the locking location information from the center communication section 202, the location information acquisition section 210 outputs the locking location information as the latest locking location information to the location information storage section 211. Accordingly, the locking location information of the electronic key terminal 200A already stored in the location information storage section 211 is updated to the locking location information acquired by the electronic key terminal with the terminal ID different from that of the electronic key terminal 200A.

The power consumption suppression section 220 calculates a relative distance between the location of the electronic key terminal 200A and the latest location of the vehicle 100 based on the updated locking location information and causes the application execution section 231 to execute or stop the application program.

Hereinafter, operation of the power consumption suppression system for an electronic key terminal and the power consumption suppression method for an electronic key terminal according to the present embodiment will be described with reference to FIGS. 6 to 9.

As illustrated in FIG. 6, when the vehicle 100 is used by the user of the electronic key terminal 200A (step S200: YES), it is determined whether the locked state of the doors of the vehicle 100 has been detected (step S201). When the locked state of the doors of the vehicle 100 is detected (step S201: YES), locking location information indicating the location where the locked state of the doors is detected is acquired and stored in the location information storage section 211 of the electronic key terminal 200A. The locking location information is transmitted from the electronic key terminal 200A to the center 300 and is managed by the center 300 (step S202).

Then, the center 300 determines whether there is any user with the right to use the vehicle 100 other than the user of the electronic key terminal 200A (step S203). When there is a user with the right to use the vehicle 100 other than the user of the electronic key terminal 200A (step S203: YES), the center 300 delivers the locking location information acquired by the electronic key terminal 200A to the electronic key terminal possessed by the user other than the user of the electronic key terminal 200A. When there is no user with the right to use the vehicle 100 other than the user of the electronic key terminal 200A (step S203: NO), this process is terminated without delivery of the locking location information from the center 300.

It is assumed that when the user of the electronic key terminal 200A as the first electronic key terminal is not using the vehicle 100 (step S200: NO), the center 300 distributes new locking location information (step S205: YES). In this case, under the condition that the location of the vehicle 100 indicated by the locking location information has been changed (step S206: YES), for example, the locking location information stored in the location information storage section 211 is updated (step S207).

When the location of the vehicle 100 indicated by the locking location information has not been changed from the location indicated by the locking location information already stored in the location information storage section 211 (step S206: NO), this process is terminated without updating the locking location information stored in the location information storage section 211.

Figure 7:
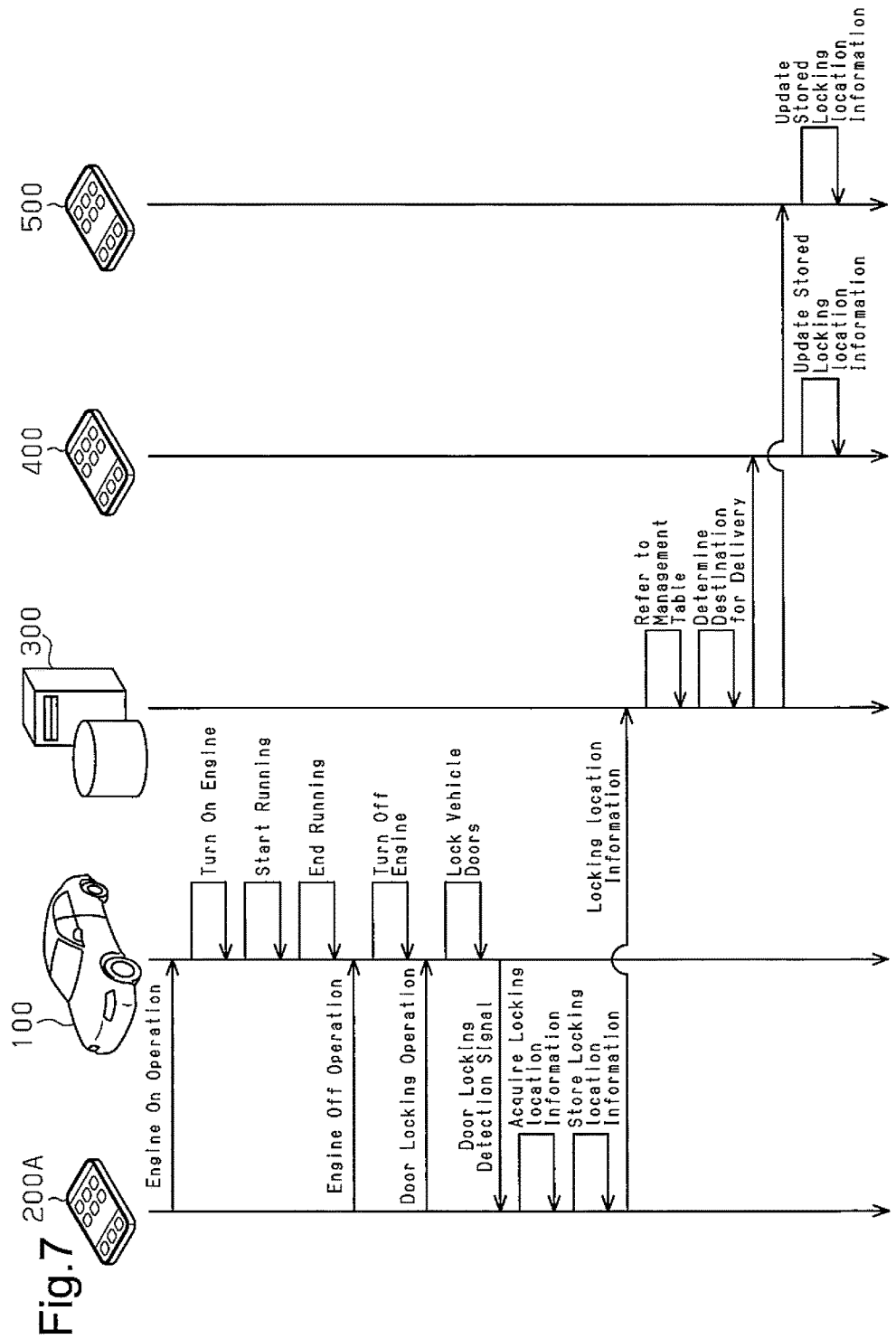
FIG. 7 is a sequence diagram illustrating one example of a locking location information delivery procedure by the center of FIG. 4.

As illustrated in the sequence diagram of FIG. 7, the electronic key terminal 200A is provided as the first electronic key terminal, and electronic key terminals 400 and 500 are provided as the second electronic key terminals. The electronic key terminals 400 and 500 have the same functions as those of the electronic key terminal 200A.

First, the state of the vehicle 100 is changed from turning-on of the engine, start of running, end of running, and turning-off of the engine, in this order, according to the operation of the electronic key terminal 200A. When the doors of the vehicle 100 are locked with the electronic key terminal 200, the vehicle 100 transmits to the electronic key terminal 200A the result of detection on the locked doors.

The electronic key terminal 200A acquires the locking location information based on the result of detection on the locked doors and stores the same in the location information storage section 211. The locking location information is transmitted from the electronic key terminal 200A to the center 300.

The center 300 refers to the management table 321 to determine the terminal IDs of the electronic key terminals 400 and 500 possessed by the users sharing the vehicle 100. These electronic key terminals 400 and 500 are determined as destinations to which the locking location information transmitted from the electronic key terminal 200A to the center 300 is to be delivered. Accordingly, the latest locking location information acquired by the electronic key terminal 200A is delivered to the electronic key terminals 400 and 500 possessed by the users sharing the vehicle 100.

The electronic key terminals 400 and 500 store the locking location information delivered from the center 300 as locking location information indicating the latest location where the vehicle 100 is locked. Like the electronic key terminal 200A, these electronic key terminals 400 and 500 suppress the power consumption based on the relative distance.

Figure 8:
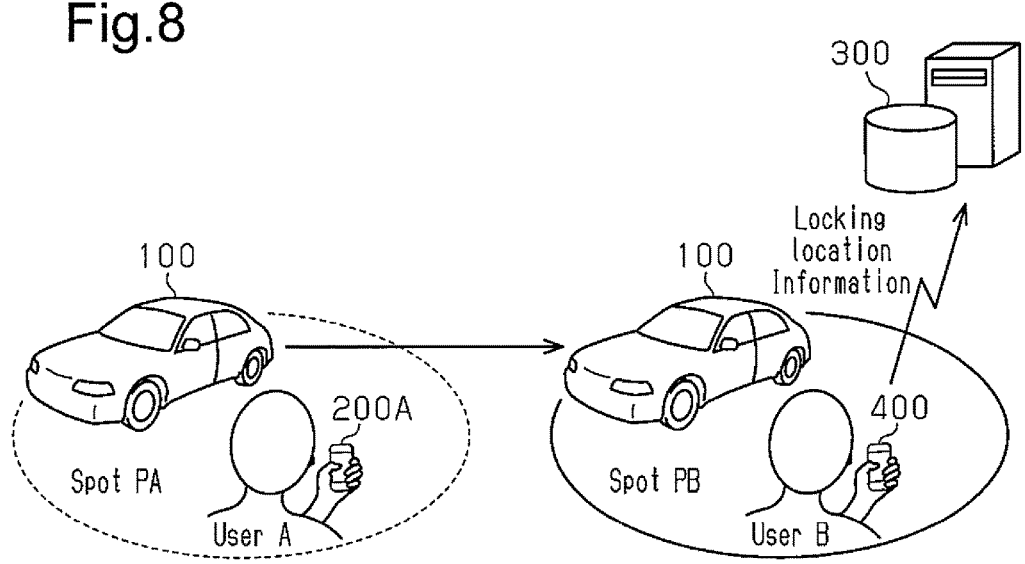
FIG. 8 is a schematic diagram illustrating one example of locking location information collected by the center from a first electronic key terminal after usage of the vehicle of FIG. 4.

Accordingly, as illustrated in FIG. 8, when the user B of the users A to C sharing the vehicle 100 uses the vehicle 100 to change the location where the vehicle 100 was locked, for example, the electronic key terminal 400 transmits the locking location information indicative of the changed location to the center 300.

Figure 9:
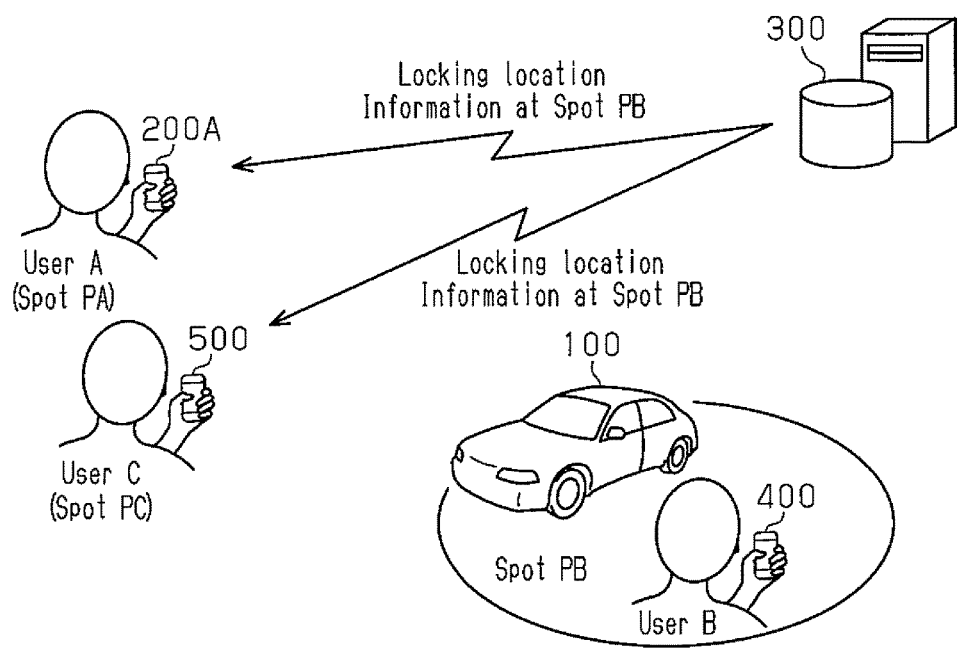
FIG. 9 is a schematic diagram illustrating one example of locking location information delivered from the center of FIG. 4 to second electronic key terminals.

As illustrated in FIG. 9, the locking location information transmitted from the electronic key terminal 400 to the center 300 is then transmitted to the electronic key terminal 200A possessed by the user A existing at a spot PA and the electronic key terminal 500 possessed by the user C existing at a spot PC.

As described above, according to the power consumption suppression system for an electronic key terminal and the power consumption suppression method for an electronic key terminal according to the present embodiment, it is possible to obtain the foregoing advantages (1), (2) and the following advantages.

(3) The center 300 manages the locking location information acquired by the electronic key terminals including the electronic key terminal 200A. When the vehicle doors are locked with the first electronic key terminal (for example, the electronic key terminal 200A) included in the electronic key terminals, the center 300 acquires the locking location information from the first electronic key terminal. The center 300 delivers the acquired locking location information to the second electronic key terminals 400 and 500 different from the electronic key terminal 200A. Accordingly, when the vehicle is used by the user of the electronic key terminal 200A different from the second electronic key terminals 400 and 500, the locking location information indicating the location of the vehicle after the usage is delivered to the second electronic key terminals 400 and 500. Therefore, even when the location of the vehicle 100 is changed by the user of the electronic key terminal 200A using the vehicle 100, the second electronic key terminals 400 and 500 can keep track of the changed location.

(4) The location information acquisition section 210 of the electronic key terminal 200A updates the locking location information of the shared vehicle 100 with the locking location information delivered from the center 300. Accordingly, regardless of whether the vehicle 100 is shared or not, the power consumption can be suppressed based on the latest location of the vehicle 100.

(5) The center 300 holds the management table 321 and identification information on the users sharing the vehicle 100 or the electronic key terminal 200A possessed by the user is registered in the management table 321 for each of the vehicles. The center 300 refers to the management table 321 to determine the destination to which the locking location information is to be delivered. Accordingly, the locking location information is smoothly operated and the destination to which the locking location information is to be delivered is properly determined. Therefore, the locking location information is properly delivered to the electronic key terminal 200A possessed by the user sharing the vehicle 100 and others.

Other Embodiments

The above described embodiments may be modified as follows.

In the foregoing embodiments, the locked state of the doors is detected based on the control signal from the door locking control section 120 of the vehicle 100. However, the disclosure is not limited thereto. Alternatively, the locked state of the doors may be detected based on switch-on or off of the accessory position of the vehicle 100. Also alternatively, the locked state of the doors may be detected based on a control signal from the control device controlling the engine of the vehicle 100. Further alternatively, the locked state of the doors may be detected based on detection whether the lock operation function has been used with the electronic key terminal 200 or 200A, for example. When the locked state of the doors is detected based on the detection that the lock operation function has been used with the electronic key terminal 200 or 200A, there is no need for communications between the on-vehicle device 110 and the electronic key terminal 200 or 200A to notify the locked state of the door. Accordingly, the power consumption in the electronic key terminal 200 or 200A is further suppressed. Besides, the locked state of the doors of the vehicle 100 may be detected based on the event that the running speed of the vehicle 100 remains 0 for a predetermined period of time, the latitude and longitude of the vehicle 100 measured by the GPS remain unchanged for a predetermined period of time, or the parking brake has been operated.

In the foregoing embodiments, the locking location information is acquired by the GPS provided in the electronic key terminal 200 or 200A. However, the disclosure is not limited thereto. Alternatively, when the vehicle 100 includes a GPS, the locking location information may be acquired by the GPS included in the vehicle 100. Accordingly, the locking location information is transmitted together with the result of detection on the locked state of the door from the vehicle 100 to the electronic key terminal 200 or 200A. For example, based on the carrier of the electronic key terminal 200 or 200A or the on-vehicle communicator 101, the location of the electronic key terminal 200 or 200A or the on-vehicle communicator 101 may be determined and the result of the determination may be used as locking location information.

In the foregoing embodiments, the power consumption is suppressed by stopping execution of the application program by the application execution section 231. However, the disclosure is not limited thereto. Alternatively, power consumption may be suppressed by extending the intervals between communications between the electronic key terminal 200 or 200A and the on-vehicle device 110 after execution of the application program than those in the normal mode. When the electronic key terminal 200 or 200A includes the telephone function and the telecommunication function enabling connection to the Internet, the power consumption may be suppressed by disabling the telephone function and the telecommunication function. The power consumption may be suppressed by a combination of the foregoing methods.

In the second embodiment, the destination for delivery of the locking location information is determined by referring to the management table 321 stored in the storage area 320 of the center 300. However, the disclosure is not limited thereto. Alternatively, the management table 321 may be included in the vehicle 100. The destination for delivery of the locking location information may be determined by referring to the management table 321 in the vehicle 100, and the locking location information may be delivered by the telecommunication function of the vehicle 100.

The electronic key terminal 200 or 200A is formed by a multi-function telephone. However, the disclosure is not limited thereto. Alternatively, the electronic key terminal may be formed by a mechanical key including the location information acquisition section 210 and the power consumption suppression section 220. The electronic key terminal only needs to be a terminal enabling control of the locked or unlocked state of the doors of the vehicle 100 and starting or stopping of the engine through telecommunications.

DESCRIPTION OF THE REFERENCE NUMERALS

100 . . . Vehicle, 101 . . . On-vehicle communicator, 102 . . . Door locking detection section, 110 . . . On-vehicle device, 120 . . . Door locking control section, 130 . . . Engine control section, 200 . . . Electronic key terminal, 200A . . . Electronic key terminal (first electronic key terminal), 201 . . . Local communication module, 202 . . . Center communication section, 210 . . . Location information acquisition section, 211 . . . Location information storage section, 220 . . . Power consumption suppression section, 230 . . . Authentication section, 231 . . . Application execution section, 300 . . . Center, 301 . . . Communication section, 310 . . . Locking location information management section, 320 . . . Storage area, 321 . . . Management table, 400, 500 . . . Electronic key terminal (second electronic key terminal)

The invention claimed is:

1. A power consumption suppression system for an electronic key terminal that suppresses power consumption in an electronic key terminal that communicates with an on-vehicle device in a vehicle, the system comprising one or more electronic circuits installed in the electronic key terminal, the electronic circuits including:
a location information acquisition ECU configured to acquire locking location information as information on a location where the vehicle has been locked with the electronic key terminal and terminal location information as information on a location of the electronic key terminal; and
a power consumption suppression ECU configured to suppress power consumption in the electronic key terminal when a relative distance between the location where the vehicle has been locked indicated by the locking location information acquired by the location information acquisition ECU and the location of the electronic key terminal indicated by the terminal location information is equal to or longer than a prescribed distance,
wherein the location information acquisition ECU is configured to hold the lock location information in the electronic key terminal,
wherein the location information acquisition ECU is configured to acquire the relative distance from the locking location information acquired by the location information acquisition ECU without requiring periodic communications with the vehicle and held in the electronic key terminal, and the terminal location information acquired at each time.

2. The power consumption suppression system according to claim 1, further comprising a center that manages the locking location information, wherein
the vehicle is used by a plurality of users,
the on-vehicle device communicates with a plurality of electronic key terminals possessed by the users, and
when the vehicle is locked with a first electronic key terminal, which is one of the electronic key terminals, the center acquires the locking location information from the first electronic key terminal and delivers the acquired locking location information to a second electronic key terminal, which is different from the first electronic key terminal.

3. The power consumption suppression system according to claim 2, wherein a location information acquisition ECU provided in the second electronic key terminal updates acquired information on the location where the vehicle, which is used by the plurality of users, has been locked with the locking location information delivered from the center.

4. The power consumption suppression system according to claim 2, wherein
the center holds a management table in which identification information on users sharing the vehicle or identification information on the electronic key terminals possessed by the users is registered for each vehicle, and
the center refers to the management table to determine the second electronic key terminal to which the locking location information is to be delivered.

5. The power consumption suppression system according to claim 1, wherein
the electronic key terminal includes an authentication ECU that authenticates the on-vehicle device through execution of an application program for authentication, and
the power consumption suppression ECU sets an area of execution of the application program by the authentication ECU within a range of the prescribed distance, thereby suppressing the power consumption in the electronic key terminal.

6. The power consumption suppression system according to claim 1, wherein the power consumption suppression ECU changes intervals between executions of communications for authentication between the electronic key terminal and the on- vehicle device, thereby suppressing the power consumption in the electronic key terminal.

7. The power consumption suppression system according to claim 1, wherein
the electronic key terminal is a mobile terminal with a telephone function and a telecommunication function, and
the power consumption suppression ECU turns off at least one of the telephone function and the telecommunication function of the mobile terminal, thereby suppressing the power consumption.

8. A power consumption suppression method for an electronic key terminal by which power consumption in an electronic key terminal that communicates with an on-vehicle device in a vehicle is suppressed, the method comprising:
acquiring locking location information as information on a location where the vehicle has been locked with the electronic key terminal and terminal location information as information on a location of the electronic key terminal;
holding the lock location information in the electronic key terminal; and
suppressing the power consumption in the electronic key terminal when a relative distance between the location where the vehicle has been locked indicated by the acquired locking location information and the location of the electronic key terminal indicated by the terminal location information is equal to or longer than a prescribed distance,
acquiring the relative distance from the locking location information without requiring periodic comunications with the vehicle and held in the electronic key terminal, and the terminal location information acquired at each time.

9. A multi-function telephone adapted for communicating with an on-vehicle device in a vehicle, the multi-function telephone comprising one or more electronic circuits including:
a location information acquisition ECU configured to acquire locking location information as information on a location where the vehicle has been locked with the electronic key terminal and terminal location information as information on a location of the electronic key terminal; and a power consumption suppression ECU configured to suppress power consumption in the electronic key terminal when a relative distance between the location where the vehicle has been locked indicated by the locking location information acquired by the location information acquisition ECU and the location of the electronic key terminal indicated by the terminal location information is equal to or longer than a prescribed distance, wherein the multi-function telephone is configured to hold the lock location information, wherein the location information acquisition ECU is configured to acquire the relative distance from the locking location information acquired by the location information acquisition ECU without requiring periodic communications with the vehicle and held in the electronic key terminal, and the terminal location information acquired at each time.

* * * * *